United States Patent [19]
Sato

[11] 3,935,775
[45] Feb. 3, 1976

[54] IRON PIECE SHEARING MACHINE

[75] Inventor: Masami Sato, Yokohama, Japan

[73] Assignee: Sango Company, Limited, Japan

[22] Filed: Aug. 16, 1974

[21] Appl. No.: 498,849

[30] Foreign Application Priority Data
Aug. 28, 1973  Japan.................. 48-100867[U]

[52] U.S. Cl. ............... 83/355; 83/104; 83/113; 83/165; 83/349; 83/409; 83/436; 83/356.3; 83/508; 83/906
[51] Int. Cl.².... B26D 5/20; B26D 7/06; B26D 1/20
[58] Field of Search ............ 83/104, 113, 165, 409, 83/436, 508, 906, 355, 356.3, 349

[56] References Cited
UNITED STATES PATENTS

| | | | |
|---|---|---|---|
| 2,655,213 | 10/1953 | Anderson | 83/355 |
| 2,908,329 | 10/1959 | Powell | 83/355 X |
| 3,324,753 | 6/1967 | Lindau | 83/355 |
| 3,493,993 | 2/1970 | Koski | 83/355 X |
| 3,587,373 | 6/1971 | Astrand | 83/355 X |

Primary Examiner—Donald R. Schraw
Assistant Examiner—W. D. Bray
Attorney, Agent, or Firm—Holman & Stern

[57] ABSTRACT

An iron piece shearing machine which comprises in combination an iron strip supply source from which at least one continuous length of iron web or strip is payed out, a pair of upper and lower feed rollers positioned midway of the passage of said iron strip extending from said supply source and having a nip defined therebetween, a pair of upper and lower spaced stationary blades positioned downstream of said feed rollers in the passage of the iron strip and having an iron strip guide clearance defined therebetween, and a high speed rotary shearing cutter assembly positioned adjacent to the distal ends of said stationary blades to shear small pieces having a small square cross-section area off the remaining portion of said iron strip in cooperation with the stationary blades.

6 Claims, 5 Drawing Figures

IRON PIECE SHEARING MACHINE

BACKGROUND OF THE INVENTION

This invention relates to an iron piece shearing machine and more particularly, to an iron piece shearing machine especially suitable for shearing iron pieces having a relatively small square cross-section area off a continuous length of iron strip which is relatively thin and narrow as the strip is continuously fed.

The small iron pieces obtainable by the shearing machine of the invention find its application in the field of building and civil engineering industry. It has been known that such iron pieces are admixed with the conventional materials of concrete before the concrete is placed to substantially increase the strength of the concrete.

Since such reinforcing iron pieces are employed in a substantially great amount in each concrete placement operation, it is desired to provide an iron piece shearing machine which rotates at a high speed to produce a plurality of iron pieces in a single shearing operation. However, unfortunately, up to date, there has been provided no practical iron piece shearing machine which can produce such a great number of iron pieces in a brief period of time, which can be constructed at a low expense and which is relatively free of trouble.

SUMMARY OF THE INVENTION

One object of the present invention is to provide an iron piece shearing machine which can shear a number of iron pieces having a relatively small square cross-section area off a continuous length of iron web or strip with a high efficiency in a brief period of time.

Another object of the present invention is to provide an iron piece shearing machine in which a plurality of juxtaposed iron webs or strips are rolled on a common shaft to be payed out of the shaft and a plurality of juxtaposed rotary cutters corresponding to the rolls in the number are provided adjacent to stationary blades which are positioned at the distal end of the passage of the strips so that the rotary cutters and stationary blades cooperate with each other to shear iron pieces having a small square cross-section area off the strips.

According to the present invention, the teeth on each rotary cutter is offset with respect to the teeth on the adjacent rotary cutters by a small angle so that the rotary cutters effect the shearing action by turns, but do not effect the shearing action simultaneously resulting in the elimination of application of any excess load on cutter dirve means.

Furthermore, according to the present invention, when the rotary cutters are desired to be reground, the teeth on the cutters are aligned with each other so that all the cutters can be simultaneously reground by a common grinding wheel to thereby accelerate the regrinding operation on the rotary cutters.

A further object of the present invention is to provide an iron piece shearing machine which comprises in combination an iron strip supply source from which a plurality of continuous length of iron strips rolled in a juxtaposed relationship are payed in increment out of the supply source, a pair of upper and lower feed rollers positioned along the passage of the strips extending from the strip supply source and having a nip defined therebetween, a pair of upper and lower spaced stationary blades positioned along the strip passage on the downstream of the feed rollers defining a strip guide clearance therebetween and a plurality of juxtaposed high speed rotary cutters positioned adjacent to the distal ends of the stationary blades to cooperate with the stationary blades so as to shear iron pieces having a small square cross-section area off the continuous length of the strips as the strips are fed in increment by the feed rollers.

According to the present invention, there has been provided an iron piece shearing machine which comprises in combination a machine frame, a feed roller drive motor rotatably mounted on said machine frame, a speed change gear operatively connected to said motor to be driven by the motor, a drive spur gear rotatably mounted on said machine frame and operatively connected to said speed change gear to be driven by the gear, a driven spur gear rotatably mounted on said machine frame in meshing with said drive spur gear to be driven by the drive gear, a lower feed roller coaxial with said drive spur gear, an upper feed roller coaxial with said driven spur gear and in contact with said lower feed roller to define a nip therebetween, a pair of upper and lower spaced stationary blades mounted on said machine frame downstream of said feed rollers and defining a nip therebetween, a strip supply source from which at least one continuous length of iron strip is payed out in increment, a pair of upper and lower spaced stationary blades mounted on said machine frame on the downstream of said feed rollers in the passage of said iron strip extending from the strip supply source through the nip between the feed rollers and defining a clearance therebetween through which said iron strip is guided, a rotary cutter assembly positioned adjacent to the distal ends of said stationary blades for cooperating with the blades so as to shear iron pieces having small square cross-section area off said continuous length of iron strip as the strip is fed in increment and a cutter drive motor mounted on said machine frame in driving relationship to said rotary cutter assembly for driving the cutter assembly.

The above and other objects and attendant advantages of the present invention will be more readily apparent to those skilled in the art from a reading of the following detailed description of the invention in conjunction with the accompanying drawings which show one preferred embodiment of the invention for illustration purpose only, but not for limiting the scope of the same in any way.

BRIEF DESCRIPTION OF THE DRAWINGS

The accompanying drawings show one preferred embodiment of iron piece shearing machine constructed in accordance with the present invention in which.

PREFERRED EMBODIMENT OF THE INVENTION

This invention will be now described referring to the accompanying drawings in which one preferred embodiment of iron piece shearing machine of the invention is shown for illustration.

Figure 1:
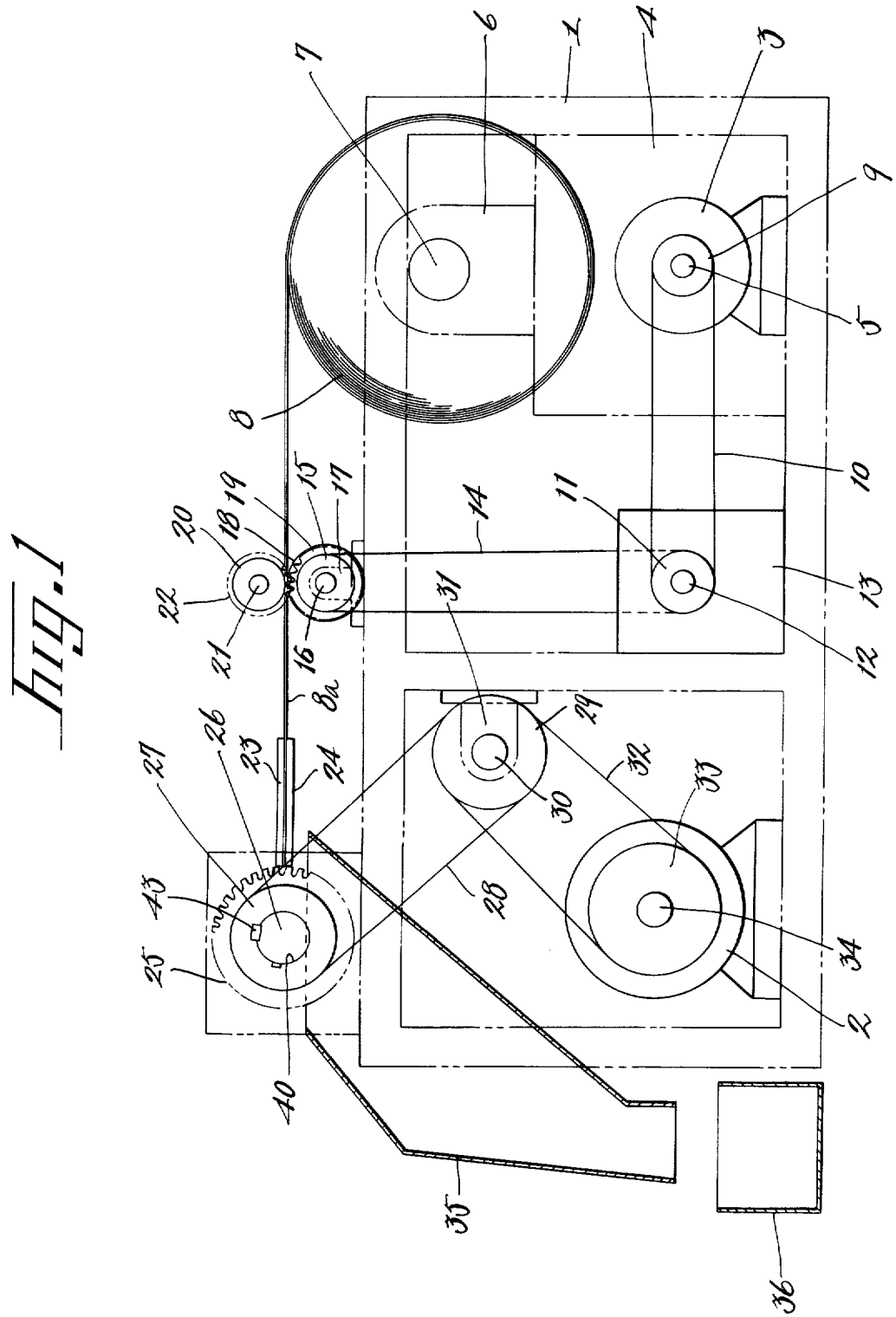
FIG. 1 is a schematic elevational view in longitudinal section of said shearing machine.
Figure 2:
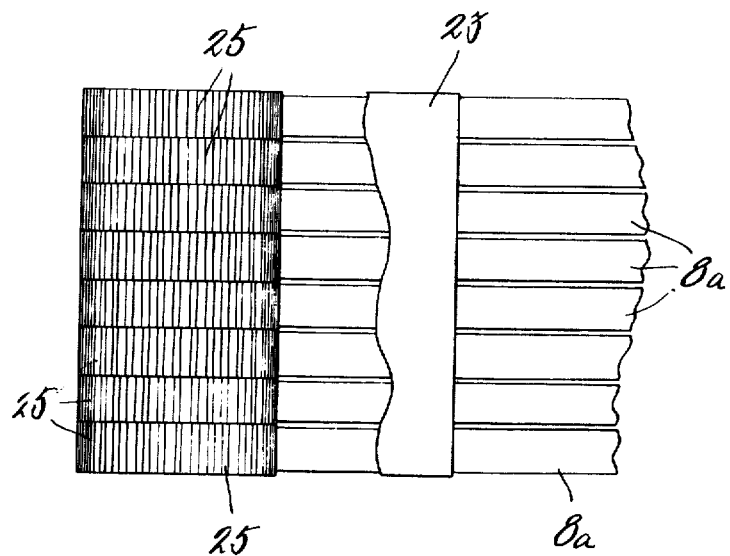
FIG. 2 is a fragmentary plan view on an enlarged scale of the iron piece shearing arrangement of said machine of FIG. 1 with portion thereof broken away.
Figure 5:
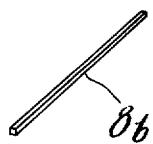
FIG. 5 is a perspective view of one of the products or iron pieces produced by said machine.

The shearing machine generally comprises a machine frame 1 on which the various components of the machine are mounted. A cutter drive motor 2 is rotatably mounted at one end (the left-hand end as seen in FIG. 1) of the machine frame 1 in the lower portion of the frame and a feed roller drive motor 3 is rotatably mounted at the other end of the machine frame (the right-hand end as seen in FIG. 1) in the lower portion of the frame. The motors 2 and 3 are driven in synchronization from a common power source (not shown). The feed roller drive motor 3 is housed in a casing 4 which is in turn suitably mounted at the right-hand end of the machine frame 1 in the lower portion of the frame and the motor has the output shaft 5 journalled in the casing 4. A pair of upright support brackets 6 (only one of the brackets is shown in FIG. 1) extend upwardly from the top of the casing 4 on the opposite sides thereof.

A shaft 7 to support web or strip material is journalled in the support brackets 6 and a plurality of strip rolls 8 are wound about the shaft 7 in a laterally spaced relationship to each other to be simultaneously payed off the shaft 7 as will be described later in conjunction with the operation of the machine. A pulley 9 is mounted at one end of the motor shaft 5 for rotation therewith and an endless belt or chain 10 is trained over the pulley. The endless belt 10 is also trained over one of the grooves in a double grooved pulley 11 on the shaft 12 of a speed change gear 13 which is mounted on the support frame 1 in the lower portion thereof between the motors 2 and 3. A further endless belt or chain 14 is trained over the other groove in the speed change gear pulley 11 and also over a pulley 15 mounted on a lower feed roll support shaft 16 which is in turn journalled in a pair of upright brackets 17 (only one of the brackets is shown in FIG. 1) formed on and extending upwardly from the top of the machine frame 1 in a position right above the pulley 11. Also mounted on the shaft 16 in coaxial relationship with the pulley 15 are a lower feed roller 18 and a lower or drive spur gear 19.

An upper feed roller 20 is mounted on a shaft 21 which is suitably mounted on the machine frame 1 in a position immediately above the shaft 16 in parallel to the latter. The lower and upper feed rollers 18 and 20 cooperate with each other in forming a nip therebetween so that the strips in juxtaposed are advanced by the nipping action of the rollers as the strips are payed out of the strip rolls on the support shaft 7. Also mounted on the shaft 21 in coaxial relationship with the feed roller 20 is an upper or driven spur gear 22 which is in meshing with the lower or drive spur gear 19 to be driven thereby in the operation of the machine.

The passage of the strips 8a extends from the strip supply rolls 8 through the nip formed by the cooperating feed rollers 18 and 20 and a pair of upper and lower spaced stationary shearing blades 23 and 24 are suitably provided machine frame 1 on the downstream of the feed rollers 18 and 20 in the strip passage, with the shearing edges of the blades positioned at the distal end of the strip passage. The upper and lower stationary blades 23 and 24 define a clearance with peripheral blades or cutters 25 toward which the strips 8a are advanced.

A high speed rotary cutter assembly comprising a plurality of rotary shearing cutters 25 are mounted on a common shaft 26 mounted on the machine frame 1 and the construction and arrangement of the rotary cutters 25 will be in detail described hereinafter referring to FIG. 3. Also mounted on the shaft 26 in coaxial relationship with the rotary cutters 25 is a pulley 27 over which an endless belt or chain 28 is trained and the belt is also trained over one of the grooves in a double grooved pulley 29 mounted on a shaft 30 which is in turn journalled in a pair of lateral brackets 31 (only one of the brackets 31 is shown in FIG. 1) positioned above and inwardly of the motor 2. A further endless belt or chain 32 is trained over the other groove of the double grooved pulley 29 and also over a pulley 33 on the output shaft 34 of the cutter drive motor 2.

A product or iron piece discharge chute 35 is provided at the product discharge end or left-hand end of the machine with the upper portion covering the lower half portion of the cutter assembly and the lower portion extending downwardly. A product receptacle 36 is positioned right below the discharge end of the lower portion of the chute 35 for receiving products from the chute 35.

Figure 3:
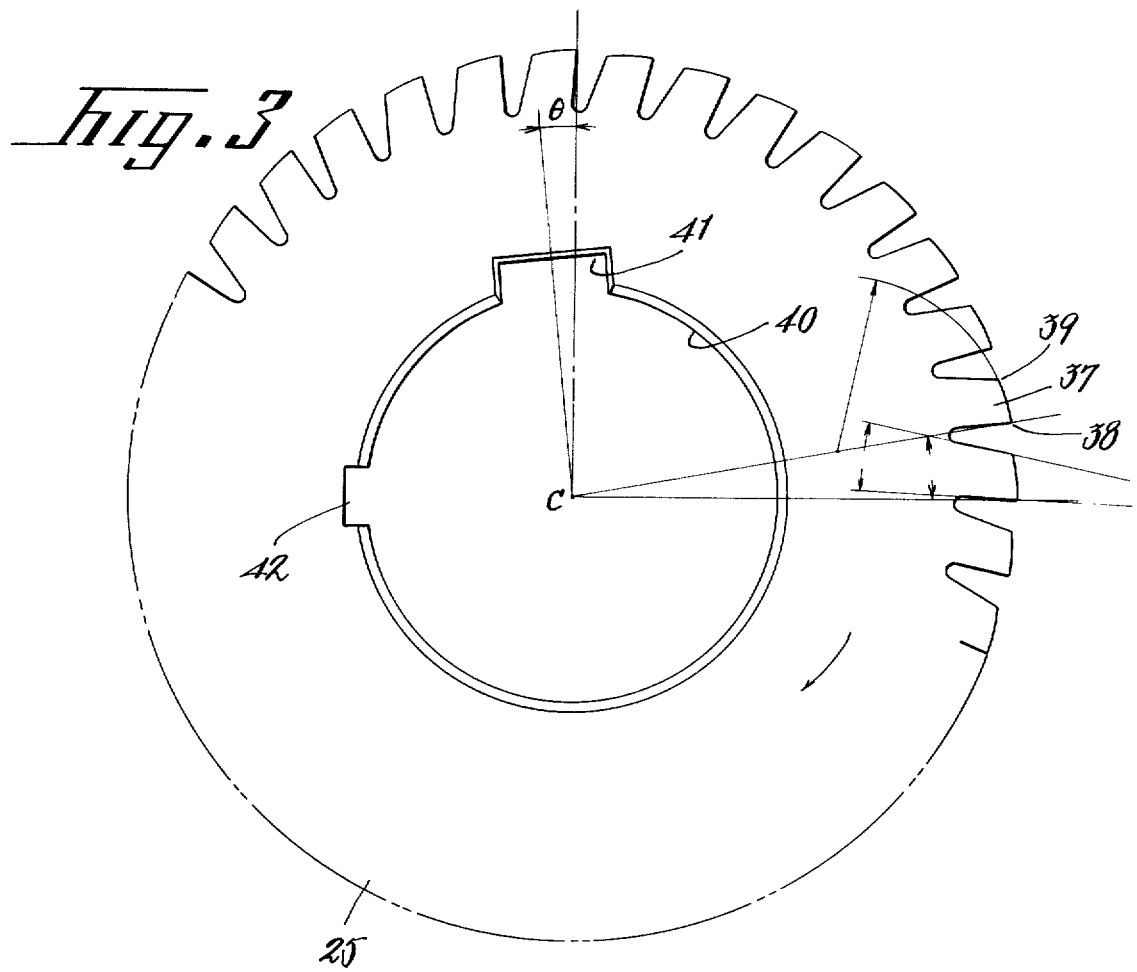
FIG. 3 further enlarged side elevational view of one of the rotary cutters employed in said machine.
Figure 4:
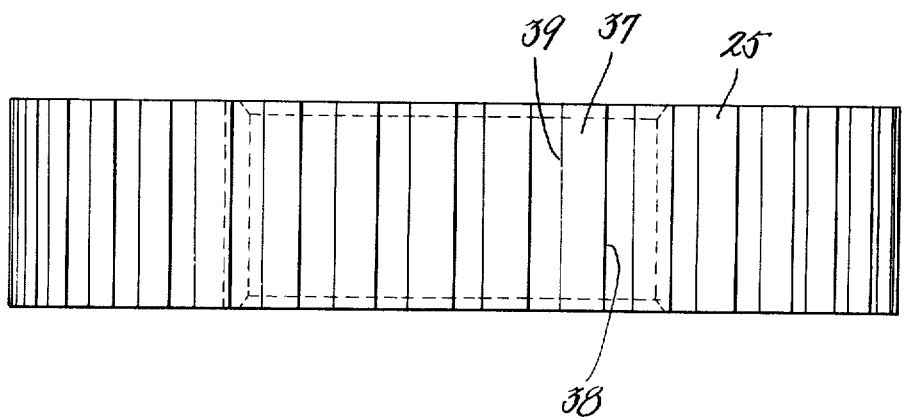
FIG. 4 is a plan view of FIG. 3.

Referring to FIGS. 3 and 4 in which one of the juxtaposed rotary shearing cutters 25 is shown. As shown in these figures, the shearing cutter has a plurality of equally spaced similar teeth 37 in its outer periphery. The arcuate configuration of the cutting face of the tooth 37 is so selected that the distance between the imaginary center C of the cutter and the leading edge 38 of cutting face is slightly greater than that between the same center and the trailing edge 39 of the cutting face ( the leading and trailing edges are defined with respect to the direction of rotation of the cutter 25 as shown by the arrow in FIG. 3 ). The inner periphery 40 is provided with a larger key way 41 and a smaller key way 42 which is located in a position angularly spaced from the larger key way. The larger key way 41 accelerates proper and prompt mounting of the cutter 25 on the shaft 26. According to the present invention, the larger key way 41 in each cutter 25 is offsetted with respect to the corresponding key ways in the adjacent cutters by the angle of $\theta$ as shown in FIG. 3 and when the machine is operated, all the shearing cutters 25 are secured to the common shaft 26 by means of keys 43 with the larger key way 41 in each cutter 25 offsetting with respect to the corresponding key ways in the adjacent cutters so that the teeth 37 on each cutter 25 are positioned in an off-phase relationship to those on the adjacent cutters.

The off-phase relationship between the teeth 37 on the adjacent cutters 25 is important in that the respective cutters are designed to effect their shearing action in sequence by turns, and all do not effect shearing at the same time. Therefore, the cutter drive motor 2 will not be subjected to any excess load which might be inevitable if all the cutters 25 were to simultaneously effect shearing in the case where the key way 41 of all the cutters 25 were aligned with each other.

On the other hand, the smaller key ways 42 in all the cutters 25 are aligned with each other so that when the cutters are to be reground, keys (not shown) are inserted in the key ways 42 to secure the cutters to the common shaft 26 with the teeth 37 in all the cutters 25 now aligned whereby the cutters can be simultaneously reground.

In the illustrated embodiment, the number of the teeth 37 of each shearing cutter is 32 and the rotation speed of the cutters is 1,700 r.p.m. The webs or strips 8a have a length of about 30 mm and the width of about 0.5mm, for example. The products 8b obtainable from the machine of the invention have a substantially square cross-section area of about 0.5 mm.

In operation, when the power source (not shown) is energized, the feed roller drive motor 3 is rotated to rotate the speed change gear 13 through the motor shaft 5, pulley 9, belt 10, pulley 11 and shaft 12. When thus rotated, the speed change gear 13 transmits the rotational movement to the shaft 16 through the pulley 11, belt 14 and pulley 15. The shaft 16 in turn rotates the lower feed roller 16 and drive spur gear 19 coaxially mounted on the shaft 16. The rotating drive spur gear 19 drives its engaging driven spur gear 22 to rotate the shaft 21 and the upper feed roller 20 thereon.

The rotating upper and lower feed rollers 20 and 18 nip the strips 8a coming from the supply rolls 8 therebetween to advance to and through the clearance 25 defined between the upper and lower stationary blades 23 and 24 to present the leading ends of the strips 8a to the shearing area defined between the stationary blades and the rotary cutter assembly.

The energization of the power source (not shown) also simultaneously rotates the cutter drive motor 2 which in turn rotates the rotary cutter assembly through the motor shaft 34, pulley 33, belt 32, pulley 29, shaft 30, belt 28, pulley 27 and shaft 26.

As the successive leading ends of the strips 8a are presented to the shearing area, the rotating rotary cutters 25 which act by turns shear successive products 8b having the above-mentioned small square cross-section area off the remaining strip portions in cooperation with the stationary blades 23 and 24. The sheared products 8b are allowed to pass through the chute 35 into the product receptacle 36 by gravity.

In the foregoing, description has been made of only one specific embodiment of the invention, but it will readily occur to those skilled in the art that the same is illustrative in nature, but does not limit the scope of the invention in any way. The scope of the invention is only limited by the appended claims.

I claim:
1. A shearing machine for producing a plurality of metal elements comprising, in combination:
   a metal strip supply source from which a plurality of adjacent, continuous lengths of metal strip are payed out in increment;
   a pair of upper and lower feed rollers positioned along a passage of said lengths of metal strip and extending from said strip supply source and defining a nip therebetween;
   a pair of upper and lower stationary blades positioned along said strip passage, downstream of said feed rollers and defining a strip guide clearance therebetween and into which said adjacent continuous lengths of metal strip simultaneously pass;
   and a high speed, rotary cutter assembly positioned adjacent the distal ends of said stationary blades, said cutter assembly having a plurality of shearing teeth in the outer periphery thereof for cooperating at the clearance with said stationary blades for shearing small pieces of the metal strips stimultaneously and into rectangular cross-sectional elements as the strip elements are fed in increment by said feed rollers, said rotary cutter assembly comprising a plurality of juxtaposed rotary cutters mounted on a support shaft, said rotary cutters corresponding to the number of adjacent, continuous lengths of metal strip, each rotary cutter having a similar number of cutter teeth and identical outer peripheries, the cutter elements being transversely apertured and having inner periphery including a radial key way, the key way of adjacent rotary cutters being angularly off set with respect to each other so that shearing strokes of adjacent cutter teeth are effected in sequence for relieving and equalizing torque imposed on the support shaft.

2. The shearing machine as set forth in claim 1 in which the cutters have arcuate cutting face, the cutting face on the cutters being selected so that the radial distance between the leading edge of the cutting face is slightly greater than the radial distance to the trailing edge of the arcuate cutting face, said radial distances being defined from the axis of rotation of said cutters.

3. An iron piece shearing machine which comprises in combination an iron strip supply source from which at least one continuous length of iron strip is payed out in increment, a pair of upper and lower feed rollers positioned along the passage of said iron strip extending from said strip supply source and defining a nip therebetween, a pair of upper and lower spaced stationary blades positioned along said strip passage on the downstream of said feed rollers and defining a strip guide clearance therebetween and a high speed rotary cutter assembly positioned adjacent to the distal ends of said stationary blades and having a plurality of shearing teeth in the periphery of the cutter assembly to cooperate with the stationary blades so as to shear iron pices having a small square cross-section area off said continuous length of iron strip as the strip is fed in increment by said feed rollers, said iron strip supply source comprising a plurality of juxtaposed continuous length of iron strips rolled about a shaft journalled in a machine frame and said rotary cutter assembly comprising a plurality of juxtaposed rotary cutters corresponding to said iron strips in number, each rotary cutter having a plurality of teeth in its periphery, the rotary cutter teeth being offset with respect to the teeth of adjacent rotary cutters and an arcuate cutting face, the inner periphery of each of said rotary cutters being provided with a relatively larger key way and a relatively smaller key way angulary spaced from said larger key way, said relatively larger key way in each rotary cutter being offsetted with respect to the corresponding key ways in the adjacent rotary cutters and said relatively smaller key ways in all the rotary cutters being aligned with each other.

4. An iron piece shearing machine which comprises in combination a machine frame, a feed roller drive motor rotatably mounted on said machine frame, a speed change gear operatively connected to said motor to be driven by the motor, a drive spur gear rotatably mounted on said machine frame and operatively connected to said speed gear to be driven by the gear, a driven spur gear rotatably mounted on said machine frame in meshing with said drive spur gear to be driven by the drive gear, a lower feed roller coaxial with said drive spur gear, an upper feed roller coaxial with said driven spur gear and in contact with said lower feed roller to define a nip therebetween, a strip supply source from which at least one continuous length of iron strip is payed out in increment, a pair of upper and lower spaced stationary blades mounted on said machine frame on the downstream of said feed rollers in the passage of said iron strip extending from said strip supply source through the nip of the feed rollers and defining a clearance therebetween through which said iron strip is guided, a rotary cutter assembly positioned adjacent to the distal ends of said stationary blades for cooperating with the blades so as to shear iron pieces having a small square cross-section area off said continuous length of iron strip as the strip is fed in increment and a cutter drive motor in driving connection with said rotary cutter assembly for driving cutter, said strip supply source comprising a plurality of juxtaposed continuous length of iron strip rolls supported on a common shaft and said rotary cutter assembly comprising a plurality of juxtaposed rotary cutters supported on a common shaft and corresponding with said plurality of iron strip rolls in number, the cutters having the same number of cutting teeth in the outer periphery, the inner periphery of said rotary cutters being provided with a relatively larger key way and a relatively smaller key way, said smaller key way being angularly spaced from said larger key way.

5. The iron piece shearing machine as set forth in claim 4, in which the teeth on each of the cutters are offset with respect to the teeth on the adjacent cutters by a small angle.

6. The iron piece shearing machine as set forth in claim 5, in which said relatively larger key way in each rotary cutter is offsetted with respect to the corresponding key ways in the adjacent rotary cutters and said relatively smaller key ways in all the rotary cutters are aligned with each other.

* * * * *